(12) United States Patent
Tallam et al.

(10) Patent No.: US 6,842,354 B1
(45) Date of Patent: Jan. 11, 2005

(54) CAPACITOR CHARGE BALANCING TECHNIQUE FOR A THREE-LEVEL PWM POWER CONVERTER

(75) Inventors: Rangarajan M. Tallam, Oak Creek, WI (US); Rajendra Naik, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/637,281

(22) Filed: Aug. 8, 2003

(51) Int. Cl.[7] .......................................... H02M 7/5387
(52) U.S. Cl. ...................................... 363/98; 363/132
(58) Field of Search ............................ 363/41, 95, 98, 363/131, 132

(56) References Cited

U.S. PATENT DOCUMENTS

| | | | |
|---|---|---|---|
| 4,953,069 A | | 8/1990 | Braun et al. |
| 5,060,129 A | | 10/1991 | Maruyama |
| 5,155,675 A | * | 10/1992 | Maruyama et al. ........... 363/98 |
| 5,361,196 A | | 11/1994 | Tanamachi et al. |
| 5,467,262 A | * | 11/1995 | Nakata et al. ................ 363/41 |
| 5,506,765 A | * | 4/1996 | Nakata et al. ................ 363/98 |
| 5,587,891 A | | 12/1996 | Nakata et al. |
| 5,627,742 A | * | 5/1997 | Nakata et al. ................ 363/98 |
| 6,058,031 A | * | 5/2000 | Lyons et al. .................. 363/67 |

OTHER PUBLICATIONS

"A Novel Approach to the Generation and Optimization of Three–Level PWM Waveforms," PESC '88 Proceedings, pp. 1255–1262.

* cited by examiner

Primary Examiner—Adolf Berhane
(74) Attorney, Agent, or Firm—Quarles & Brady; William R. Walbrun (57) ABSTRACT

A power converter includes a DC to AC inverter that is connected to a neutral node formed between first and second capacitors connected across two DC supply lines. The inverter is operated to selectively couple the DC supply lines and the neutral node to an output terminal thereby producing an alternating voltage waveform formed by a sequence of output pulses having positive, zero and negative voltage levels. To compensate for a voltage imbalance across the capacitors, an imbalance compensation coefficient is derived from the difference in voltages across the first and second capacitors and from the direction of current between the neutral node and the inverter. The imbalance compensation coefficient is employed to adjust the width of the output pulses so as to charge and discharge the capacitors to correct the imbalance.

23 Claims, 9 Drawing Sheets

| S1 | S2 | S3 | S4 | PHASE VOLTAGE | |
|---|---|---|---|---|---|
| ON | ON | OFF | OFF | 1/2 $E_{DC}$ | (P) |
| OFF | ON | ON | OFF | 0 | (0) |
| OFF | OFF | ON | ON | -1/2 $E_{DC}$ | (N) |
| ON | OFF | OFF | ON | (P) OR (N) | |

UNIPOLAR MODE

PRIOR ART
DIPOLAR
MODE

PARTIAL DIPOLAR MODE

CAPACITOR CHARGE BALANCING TECHNIQUE FOR A THREE-LEVEL PWM POWER CONVERTER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus which convert a DC supply voltage into an alternating voltage; and more particularly to such apparatus, such as motor drives and power inverters, that control electricity supplied to an electric motor.

2. Description of the Related Art

Motor drives are commonly employed to control the application of electricity to a three-phase induction motor. Such motor drives include an inverter which switches DC voltage to output lines in a pulse width modulated (PWM) manner so as to control the frequency and amount of voltage applied to the motor and thus the motor speed.

One type of an inverter, known as a two-level inverter, produces pulse width modulated (PWM) waveforms which have two voltage levels, formed by a positive voltage and a negative voltage pulses, with the width of each voltage pulse being varied to create the effective voltage level being desired. A two-level inverter generates high common-mode voltage and high transient voltages at the terminals of a motor.

In another type of inverter, known as a three-level inverter, the output voltage waveform applied to the motor has three levels, formed by a positive voltage, zero volts, and a negative voltage pulses. Lower common-mode voltage and lower transient voltages can be obtained in a three-level inverter than with a two-level inverter.

A three-level inverter has a pair of capacitors connected between the two DC supply buses to divide the DC input voltage in two and produce the zero voltage level at a "neutral node" between the two capacitors. The inverter comprises a series of switches which selectively connect the three-phase output terminals to the positive voltage bus, the negative voltage bus or the neutral node in order to produce the three voltage levels. To obtain voltage and current waveforms with low harmonic content, it is desired that the voltages across the capacitors remain balanced with low ripple.

However, the voltages across the two capacitors frequently become unbalanced during operation of a three-level inverter. This imbalance results from DC components of current flowing into and out of the neutral node under transient conditions, such as when the load applied to the motor suddenly changes. As a consequence of this voltage imbalance, the voltage level of the PWM waveform produced by connecting the neutral node to an output phase terminal is not equivalent to zero volts. The voltage rating of the switches in a three-level inverter is based on one-half the DC input voltage. Any imbalance between the capacitor voltages could result in high voltage on some of the switches and could potentially damage them.

One modulation technique for a three-level inverter is known as carrier-based pulse width modulation. In this technique, there are two different modulation modes, known as the dipolar mode and the unipolar mode, as described in "A Novel Approach to the Generation and Optimization of Three-Level PWM waveforms," PESC '88 Proceedings, pp. 1255–1262. In the dipolar mode, the inverter outputs positive voltage, zero voltage and negative voltage pulses in each PWM period, which is suitable for creating very small output voltages to operate the motor at low speed. In the unipolar mode, the inverter produces either positive voltage and zero voltage pulses or negative voltage and zero voltage pulses in a PWM period. This latter mode is more suitable for obtaining higher output voltages and thus, higher motor speeds.

Various approaches have been applied in an attempt to eliminate the capacitor voltage imbalance and thus the DC voltage offset in the PWM output waveform. In one approach, described in U.S. Pat. No. 4,953,069, the voltage balancing method works only for the dipolar mode. Another approach, described in U.S. Pat. No. 5,361,196, deals with the voltage balancing problem in both the dipolar mode and the unipolar mode. However, this technique was found to have several short comings. It was observed that the phase-to-neutral voltage waveform had transitions occurring directly from the positive voltage level to the negative voltage level and visa-versa without the occurrence of an intermediate zero voltage level. These direct transitions are undesirable, as they lead to higher common-mode voltage and step heights of the DC supply bus voltage in the motor line-to-line voltage, resulting in higher transient voltages at the motor terminals, similar to a two-level inverter.

Therefore, it is desirable to provide an improved technique that addresses the capacitor imbalance problem.

SUMMARY OF THE INVENTION

A power converter produces an alternating output voltage waveform for driving a load connected to an output terminal. That apparatus includes a first voltage supply bus and a second voltage supply bus with a DC voltage there between. A plurality of capacitors is connected in series across the first voltage supply bus and the second voltage supply bus, thereby defining a neutral node. A DC to AC inverter is connected to the first voltage supply bus, the second voltage supply bus, and the neutral node and produces the output voltage waveform at the output terminal. The output voltage waveform has positive, zero and negative voltage levels.

A controller operates the DC to AC inverter to produce a sequence of output pulses having positive, zero and negative voltage levels in which a plurality of output pulses occur during each half-cycle of an oscillating waveform. The controller adjusts a width of the output pulses during consecutive half-cycles of the oscillating waveform in response to a difference in voltages between the neutral node and each DC supply bus, and thereby compensating for an imbalance of those voltages.

In a preferred embodiment of the power converter, the controller derives an imbalance compensation coefficient from the difference in voltages between the neutral node and each DC supply bus and from a direction of current between the neutral node and the inverter. One version of the controller detects the direction of current by ascertaining a space vector of voltage produced at the output terminal and by measuring a level of current flowing through the output terminal. The width of the output pulses are then adjusted based on the imbalance compensation coefficient.

DETAILED DESCRIPTION OF THE INVENTION

Figure 1:
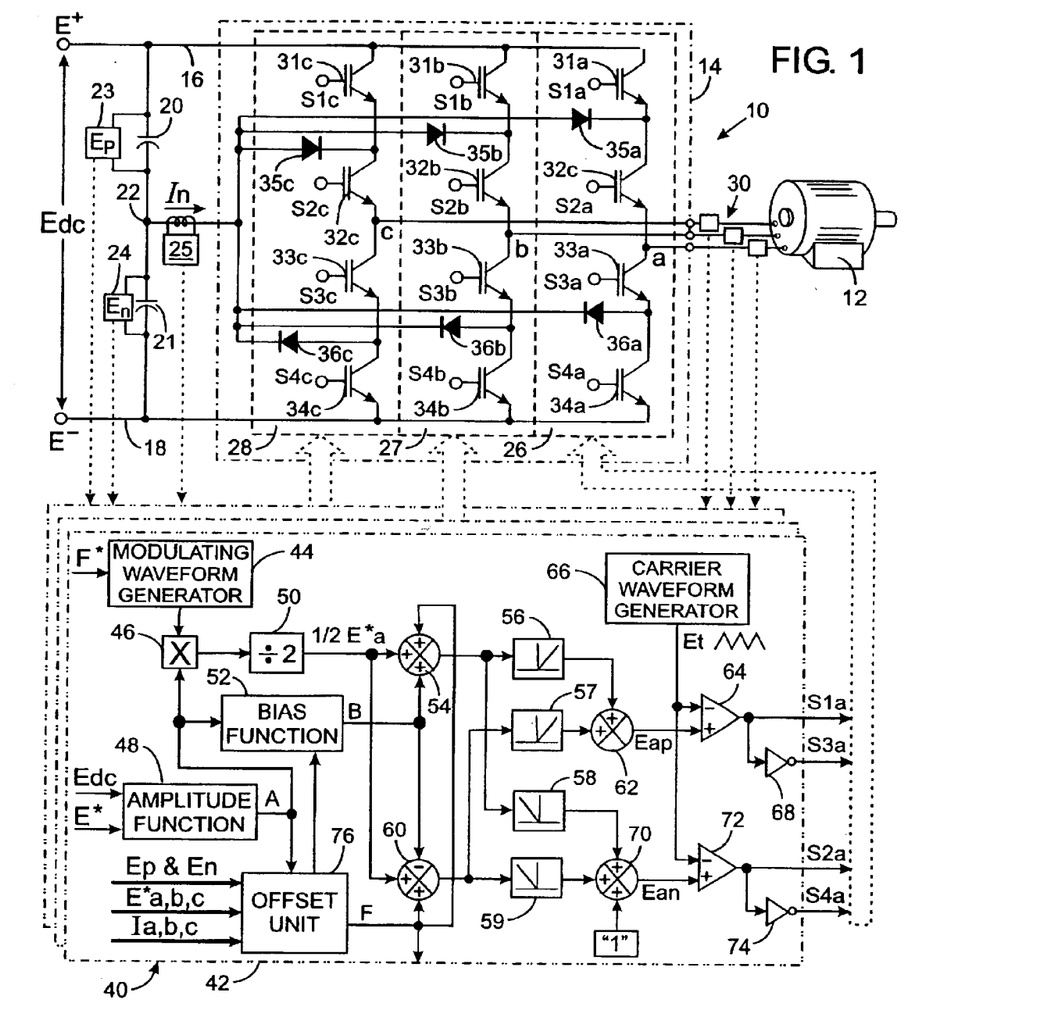
FIG. 1 is a schematic diagram of a power converter according to the present invention.

With initial reference to FIG. 1, a power converter 10 is provided to convert a DC supply voltage into an alternating voltage that drives a three-phase electric motor 12. The power converter 10 includes an inverter 14 which is connected to a pair of DC voltage supply buses 16 and 18, that are respectively at a positive voltage potential $E^+$ and a negative voltage potential $E^-$. A pair of capacitors 20 and 21 are connected in series between the DC voltage supply buses 16 and 18 with a neutral node 22 formed between the capacitors.

The inverter 14 has three phase branches 26, 27, and 28 for producing three-phase alternating current at output terminals a, b and c. Each phase branch 26–28 has four semiconductor switches 31, 32, 33 and 34, such as gate-turn-off devices or insulated gate bipolar transistors (IGBT). Note that the reference numerals designating a particular switch and other components are followed by the letter a, b or c of the associated output terminal, thereby designating in which of the three branches 26–28 the respective component is located. The circuitry of each phase branch is identical and will be described in respect of the first phase branch 26. A first switch 31a and a second switch 32a in the first phase branch are connected in series between the positive voltage supply bus 16 and the branch's output terminal "a". The node between the first and second switches 31a and 32a is coupled by a first diode 35a to the neutral node 22 to allow current to flow from the neutral node to the switches. A third switch 33a and a fourth switch 34a are connected in series between the output terminal "a" and the negative voltage supply bus 18 with the node between those switches being coupled by a second diode 36a to the neutral node 22. The second diode 36a is poled in the opposite direction to the first diode 35a.

The output terminals a, b and c of the inverter 14 are connected by separate conductors to the three-phase electric motor 12. A set of three sensors 30 are coupled to the conductors and provide signals indicating the voltage and current in those conductors, and thus at the inverter output terminals and the motor phase windings.

The four switches 31–34 in each phase branch 26–28 of the inverter 14 are operated by a controller 40, which has three separate sub-circuits for independently operating each phase branch. The details of the sub-circuit 42 for the first phase branch 26 are shown in FIG. 1, and will be described in greater detail subsequently. Each sub-circuit generates a separate output signals S1, S2, S3 and S4 for respectively controlling the four switches 31, 32, 33 and 34 in the associated inverter phase branch.

Figure 2:
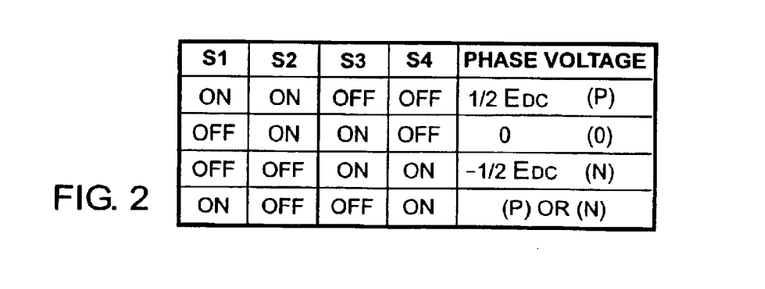
FIG. 2 is a table indicating the switching states of one phase branch in an inverter in FIG. 1.

By turning on an appropriate combination of the switches 31, 32, 33 and 34, the phase voltage produced at that branch's output terminal can be either a positive voltage (P), zero volts (0), or a negative voltage (N). FIG. 2 denotes the activation states of the four switches in a given phase branch 26–28 to produce these three different phase voltages. Note that the positive and negative voltage levels are referenced to the neutral node 22 and are one-half the magnitude of the voltage Edc across the DC voltage supply buses 16 and 18. It also can be noted that the switch control signals S1 and S3 are complementary in each switch state, as are the switch control signals S2 and S4. Only two switches are turned on at any instant of time to avoid short circuiting the capacitors 20 and 21. In addition, the combination of switch states shown in the last row of the table in FIG. 2 must be avoided, as the phase voltage at the output terminal could be either positive (P) or negative (N), depending on the direction of current in that phase.

It is common practice to represent the voltage generated by a three-phase inverter by voltage space vectors in a rectangular coordinate system relating to the motor stator. With three phase branches 26–28 where each may be in any one of the three output states (P, 0, or N), the three-level inverter 14 has twenty-seven discrete combinations of the switch states corresponding to twenty-seven voltage space vectors. However, some of voltage space vectors generate the same inverter phase voltages, thereby producing nineteen vector positions, denoted by an intersection on the hexagonal grid of FIG. 3. The nineteen unique voltage combinations result in a zero voltage vector at the center of the grid, six "small voltage" vectors at the vertices of an inner hexagon, six "large voltage" vectors at the vertices of the outer hexagon, and six "medium voltage" vectors at the midpoints of the sides of the outer hexagon. Note that three of the switch state combinations (OOO, PPP, NNN) produce the zero vector. The "small voltage" vectors also have redundancy in that both switching state combinations in the grid box produce the same motor line-to-line voltages. For example, POO and ONN represent switching states that produce a positive voltage between output terminals "a" and "b", zero voltage between output terminals b and c, and a negative voltage between output terminals c and a. However, the neutral current "In", flowing between the neutral node 22 and the inverter 14, has opposite polarity, i.e. In equals the negative phase "a" current for switch states POO and the positive phase "a" current for switch states ONN. The six discrete small voltage vectors at the vertices of an inner hexagon subdivide the complex vector space into six different 60° sectors corresponding to a range of values for the phase angle θ of the alternating voltages being produced at the inverter output terminals.

At each voltage space vector position, except for the large vectors and the zero vectors PPP and NNN, the neutral node 22 of the inverter 14 is connected to one or more of the phase terminals a, b, or c, thereby producing a neutral current "In" which charges and discharges the capacitors 20 and 21. In a steady state, the amounts of the charging and discharging are equal, or in balance, and the DC voltage Ep or En across each capacitor is equal to one-half the supply bus voltage Edc. However, without compensation as provided by the present invention, the neutral current during transient conditions may contain a DC component which results in the capacitor voltages Ep and En diverging. As a consequence, the present three-level inverter incorporates a dynamic capacitor voltage balancing technique.

Figure 3:
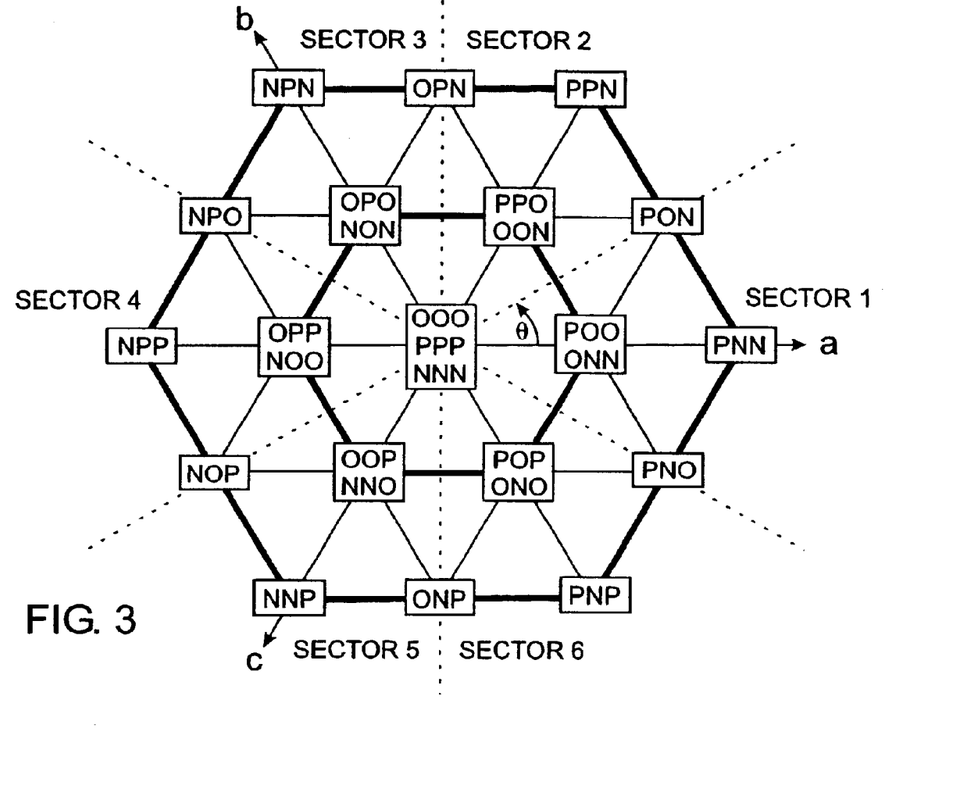
FIG. 3 is a voltage space-vector diagram illustrating the three-phase switching states of the inverter.

Selecting either of the redundant "small" vectors at a given vector position in FIG. 3 applies the same voltage levels to the electric motor. However, voltage at the neutral node 22 can be controlled to compensate for any imbalance of the capacitor voltages by adjusting the ratio of the dwell times at each redundant "small" vectors during every PWM cycle. This operation is carried out by the controller 40, which as noted previously, has a separate sub-circuit for each phase branch 26, 27 and 28 of the inverter 14. The different sub-circuits are identical with the sub-circuit 42 for the first phase branch 26, being shown in detail. The controller 40 receives a frequency command F* which defines the frequency of a sinusoidal modulating signal produced by a modulating waveform generator 44. This modulating signal is applied to one input of a multiplier 46, that also receives a signal from an amplitude circuit 48. The amplitude circuit 48 produces an amplitude value A, based on the DC supply voltage Edc and a desired voltage command E*. The multiplier 46 produces an output signal which is divided by two in a divider 50 to produce an output signal, ½ E*a.

Figure 4:
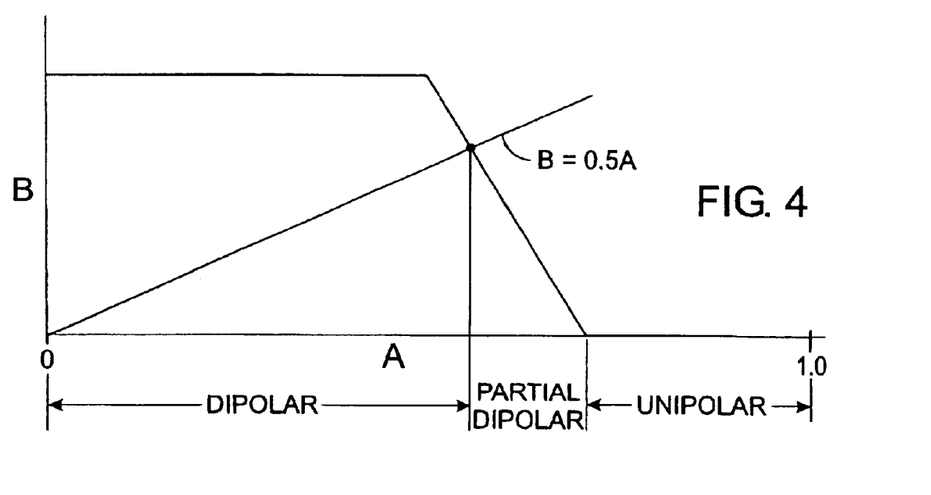
FIG. 4 is a graph depicting the relationship between the oscillating signal amplitude A and a signal bias value B.

The amplitude value A, produced by the amplitude circuit 48, also is applied to a bias function 52 which responds by generating a bias value B. FIG. 4 illustrates an exemplary relationship between the bias and amplitude values. The magnitude of the bias value B relative to the amplitude value A determines the modulation mode of the power converter 10. Specifically, the power converter operates in the dipolar modulation mode when the bias value B is greater than one-half the amplitude value A, in a partial dipolar modulation mode when 0<B≦0.5A, and in the unipolar modulation mode when B=0. To avoid two-level modulation and the switching state as indicated in the last row of the table in FIG. 2, the value of B is limited to less than 0.5.

The output signals of the divider 50 and the bias function 52 are coupled to two inputs of a first summing node 54. The resultant summed signal is applied to a first polarity discriminator 56 which passes positive voltage portions of the summed signal, and to a third discriminator 58 which passes negative voltage portions of the summed signal. The outputs of the divider 50 and bias function 52 also are applied to separate inputs of a second summing node 60 in which the bias value B is subtracted from the output of the divider 50. The resultant summation signal is applied to second and fourth polarity discriminators 57 and 59 which respectively pass the positive voltage portions and the negative voltage portion of that resultant summation signal.

Figure 5A:
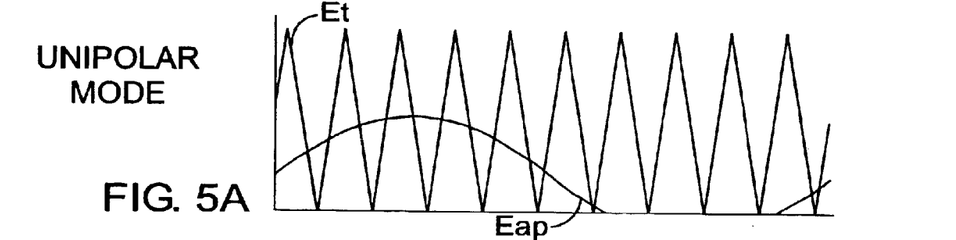
FIGS. 5A and 5B graphically illustrate the relationship of signals at inputs of a pair of comparators in the power converter.
Figure 6A:
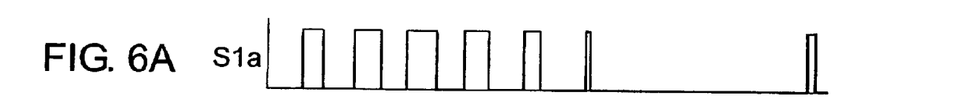
FIGS. 6A, 6B, 6C and 6D depict control signals for four semiconductor switches in one phase branch of the inverter.

The outputs of the first and second discriminators 56 and 57 are connected to inputs of a third summing node 62 which produces an output signal Eap that is applied to the non-inverting input of a first voltage comparator 64. The inverting input of the first comparator 64 is connected to the output of a carrier waveform generator 66 that produces a signal having a triangularly oscillating waveform. The first comparator 64 compares the two input signals, as depicted graphically in FIG. 5A, and produces an active output pulse whenever the amplitude of the signal Eap from the third summing node 62 is greater than the amplitude of the triangular waveform Et, see FIG. 6A. That pulsed output signal forms the first switch signal S1a which is applied to the control terminal of the first switch 31a in the associated phase branch 26 of the inverter 14. The first switch 31a turns on whenever that active pulse is present. The output signal from the first comparator 64 is inverted by a first inverter 68 to produce the complimentary switch signal S3a, shown in FIG. 6C, which is used to control the third switch 33a in the first phase branch 26.

Figure 5B:
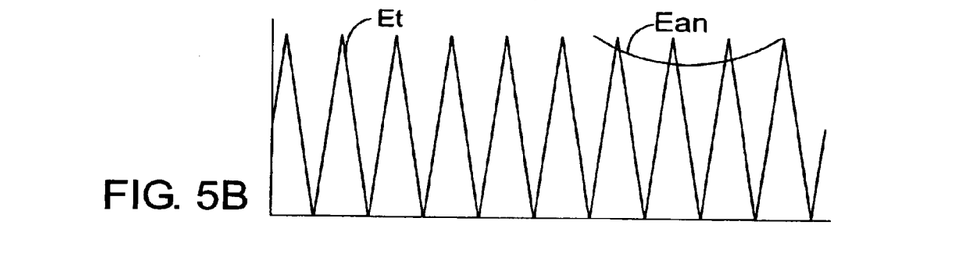
Figure 6B:
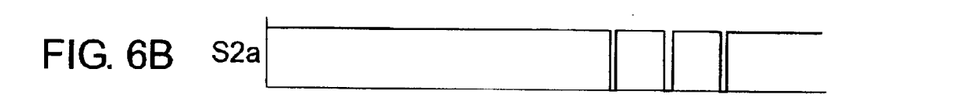
Figure 6C:
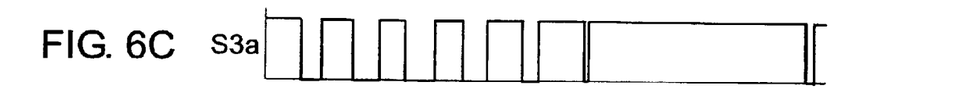
Figure 6D:
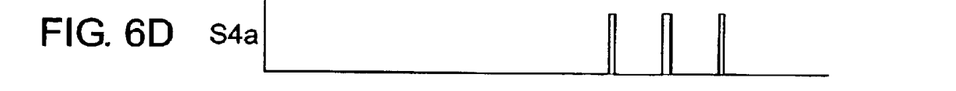

The outputs of the third and fourth polarity discriminators 58 and 59 are connected to inputs of a fourth summing node 70 which has a third input that receives a constant value corresponding an arithmetic "1". The output signal Ean from the fourth summing node 70 is applied to the non-inverting input of a second comparator 72 which has an inverting input that receives the triangular waveform Et from generator 66. The second comparator 72 produces an active output pulse whenever the amplitude of the signal Ean from the fourth summing node 70 is less than the amplitude of the triangular waveform Et, as shown in FIGS. 5B and 6B. This pulsed output signal forms the control signal S2a for the second switch 32a in the first phase branch 26. The output of the fourth comparator 74 is inverted by a second inverter 74 to produce the control signal S4a, depicted in FIG. 6D, which operates the fourth switch 34a in the associated first phase branch 26.

Figure 7:
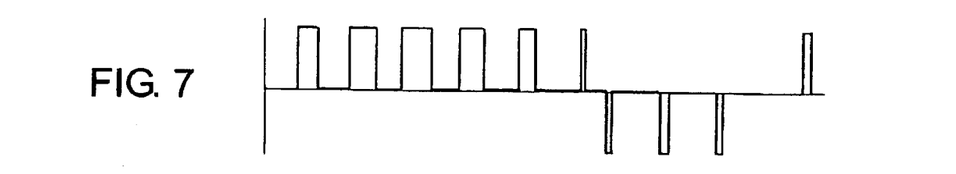
FIG. 7 is a graph of the resultant phase to neutral voltage produced by the control signals in FIGS. 6A–D.
Figure 8:
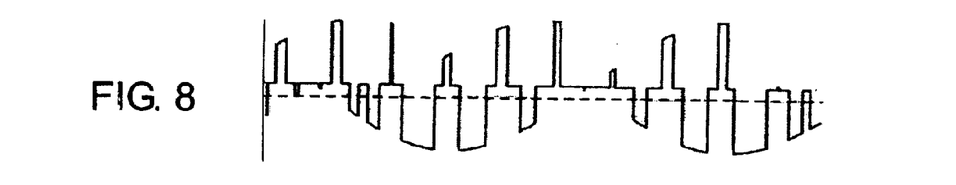
FIG. 8 is a graph of the resultant neutral current and its average value in unipolar modulation mode of the present invention.

The activation of the four switches 31a–34a in the first phase branch 26 by these control signals S1a–S4a produces a voltage between the phase terminal "a" and the neutral node 22 (phase to neutral voltage) that varies as illustrated in FIG. 7.

Figure 9A:
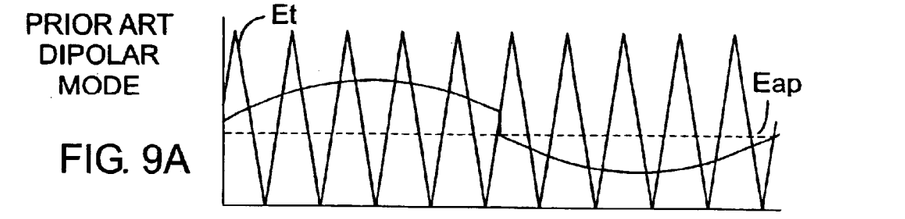
FIGS. 9A and 9B graphically illustrate the relationship of signals at inputs of a pair of comparators in a prior art power converter in the dipolar modulation mode.
Figure 9B:
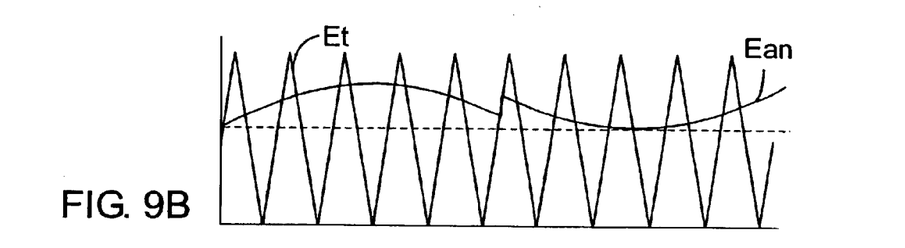
Figure 10A:
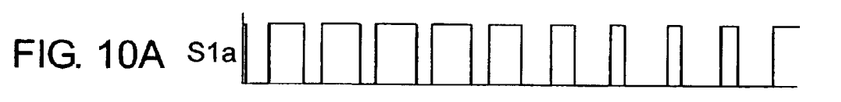
FIGS. 10A, 10B, 10C and 10D depict control signals for four semiconductor switches in one phase branch of a prior art inverter in the dipolar modulation mode.
Figure 10B:
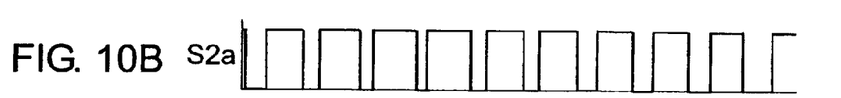
Figure 10C:
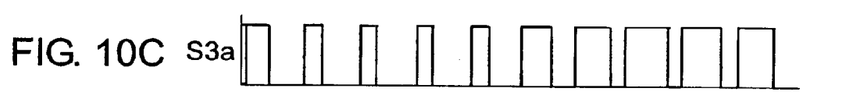
Figure 10D:
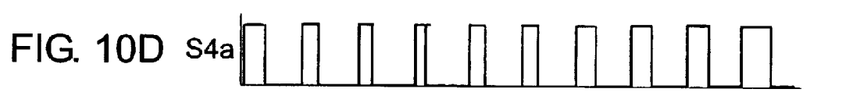
Figure 11:
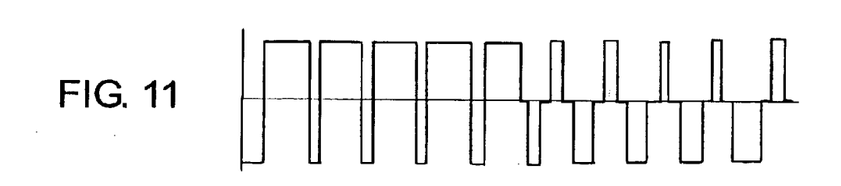
FIG. 11 is a graph of the phase to neutral voltage produced by the control signals in FIGS. 10A–D in the dipolar modulation mode according to a prior art.
Figure 12:
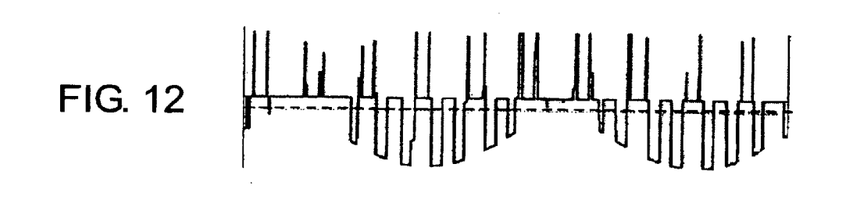
FIG. 12 is a graph of the resultant neutral current and its average value in the dipolar modulation mode according to a prior art.

As noted previously, an inequality or imbalance occurs between the voltages across capacitors 20 and 21 which offsets the neutral node voltage from zero volts. In the prior approach described in U.S. Pat. No. 5,361,196, an imbalance compensation coefficient F was calculated based on the difference between the capacitor voltages Ep and En, and a polarity selecting coefficient was set to a value of "1" in the motoring mode and to "−1" in the regenerative mode. The imbalance compensation coefficient F was added at the first summing node 54 only during the positive half cycle of the voltage signal E*a, and added at the second summing node 60 only during the negative half cycle of the voltage signal E*a resulting in signals Eap and Ean, which are shown in FIGS. 9A and 9B. The associated control signals S1a, S2a, S3a and S4a to inverter switches 31a, 32a, 33a and 34a are shown in FIGS. 10A, 10B, 10C and 10D, respectively. The corresponding phase-neutral voltage is illustrated in FIG. 11. The average value of neutral current In generated is depicted graphically in FIG. 12. It is apparent from FIG. 11, that the phase-neutral voltage experiences direct transitions between the positive voltage level and the negative voltage level without an intermediate zero voltage level occurring as for pulses 99. This is similar to a two-level inverter and causes higher common-mode voltage and peak transient voltages at the motor terminals. The maximum value of the imbalance compensation coefficient F to avoid two-level switching in this method is (1−2B), and this limits the maximum average neutral current that can be generated.

Figure 13:
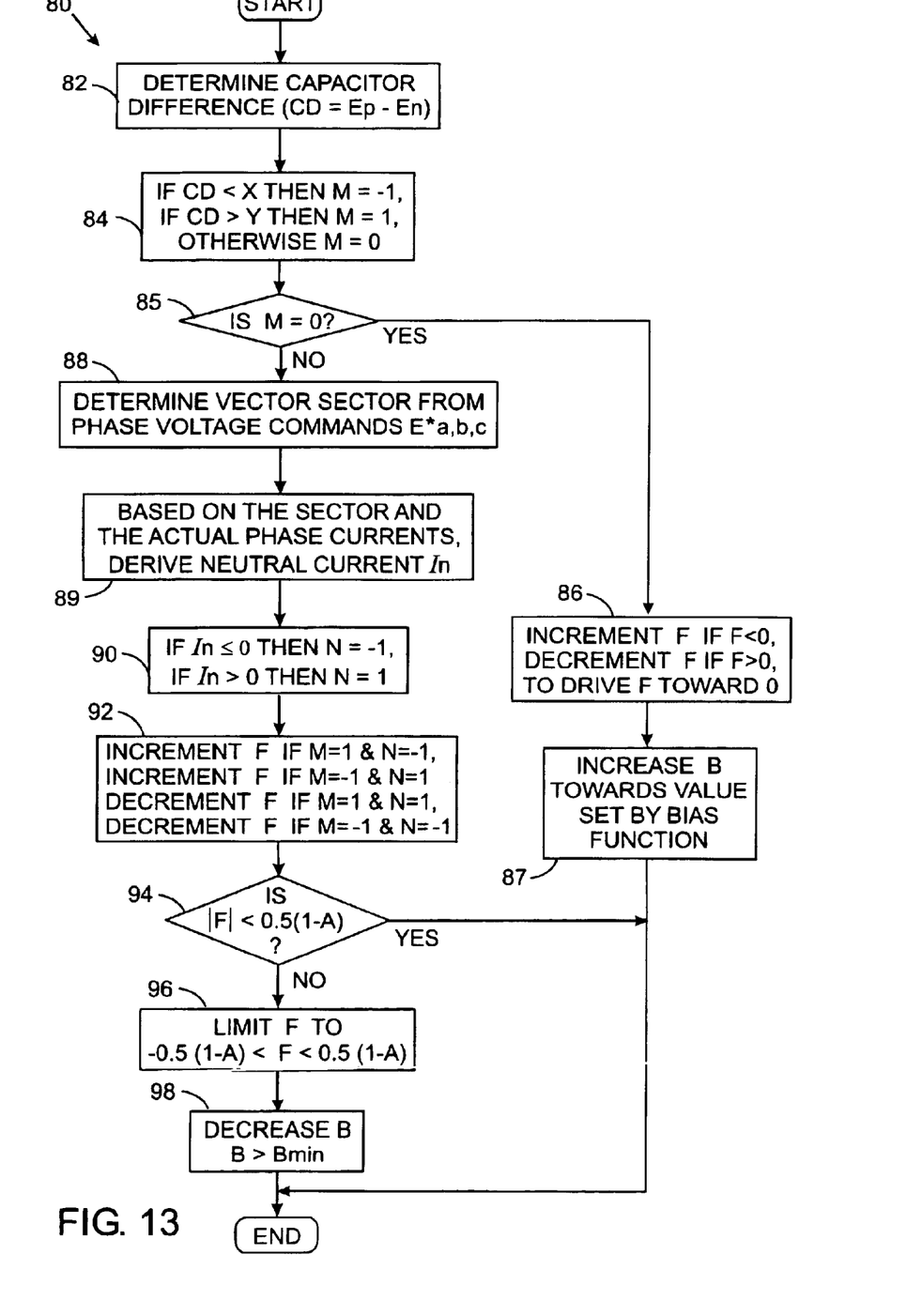
FIG. 13 is a flow chart of the process for determining a coefficient employed in the power converter to compensate for capacitor voltage imbalance.

To compensate for such imbalance in the present power converter 10, the first sub-circuit 42 of the controller 40 includes an offset unit 76 which produces an imbalance compensation coefficient F that is used by the other two sub-circuits as well. FIG. 13 is a flowchart of the procedure 80 by which the imbalance compensation coefficient F is determined. This functionality can be implemented by a software routine which a microcomputer executes periodically in synchronism with the determination of the amplitude value A by circuit 48. The imbalance compensation coefficient procedure 80 commences at step 82 where the difference between the capacitor voltages Ep and En is determined, with that difference being designated "CD". Then a step 84, a determination is made whether the capacitor voltage difference, i.e. the voltage imbalance, is significant enough to warrant correction. Specifically, if the voltage difference CD is less than a negative threshold value X, then the value of a first flag M is set to "−1". However, if the voltage difference CD is greater than a positive threshold Y, the first flag M is set to "1", otherwise the first flag M is zero indicating that correction is not necessary.

If the first flag M is found set to zero at step 85, the value of the imbalance compensation coefficient F is either incremented or decremented at step 86 to drive it towards zero. Next at step 87, the bias value B is incremented towards the value determined by the bias function 52. The execution of this pass through the imbalance compensation coefficient procedure then terminates.

If the first flag M is not found equal to zero at step 85 the procedure branches to step 88 at which the sector of the complex space vector, as graphically depicted in FIG. 3, is determined based on the voltage commands (E* a,b,c) for all three electrical phases. The determined sector and measurements of at least two of the three actual phase currents (I a,b,c) provided by sensors 30 are employed to derive the value for the neutral current In at step 89. The sign of the neutral current indicates whether it is flowing into or out of the neutral node 22 and thus, whether the capacitors 20 and 21 are charging or discharging, respectively. As noted previously, the specific states of the four switches 31–34 in each phase branch 26–28 can be used to correct the voltage imbalance on the capacitors. That is, by using one of the redundant switch states at each vector position more than the other switch state, the capacitors 20 and 21 can be intentionally charged or discharged to counter the voltage imbalance which has occurred. Therefore, at step 90, the sign of the neutral current In is inspected. If this current is less than or equal to zero, the value of a second flag N is set to "−1", whereas if the current level is positive, the second flag N is set to "1".

The values of the first and second flags M and N are employed at step 92 to determine whether the imbalance compensation coefficient F needs to be changed and if so the direction of the change. If the first flag M has a value of "1" and N is equal to "−1", or if the first flag M has a value of "−1" and N is equal to "1", the imbalance compensation coefficient F is incremented by a fixed amount. Otherwise, if the first and second flags M and N are both equal to "−1" or both equal to "1", the imbalance compensation coefficient F is decremented by that fixed amount.

Next at step 94, a determination is made whether the absolute value of imbalance compensation coefficient F is greater than the limit 0.5(1−A). When the imbalance compensation coefficient F exceeds this positive or negative limit, the amplitude of the sinusoidal signal produced at the output of the third and fourth summing nodes 62 and 70 can exceed the maximum and minimum amplitudes of the triangular waveform used by comparators 64 and 72. Such positive and negative excursions of the sinusoidal signal result in pulses being dropped in the PWM output waveforms. To prevent such pulse dropping, if the absolute value of imbalance compensation coefficient F exceeds that limit, the procedure branches to step 96 where the imbalance compensation coefficient F is set to the respective positive or negative limit.

In addition, when the magnitude of the compensation coefficient F reaches one of these limits, the bias value B is decremented. Therefore, at step 98, the bias value B is decremented by a fixed amount, as long as it is greater than a predefined minimum value, Bmin. The execution of this pass through the imbalance compensation coefficient procedure then terminates.

The capacitor voltage balancing operation of the inverter 14 the in unipolar modulation mode according to the present invention is illustrated in FIGS. 5, 6, 7 and 8 for a positive voltage error, i.e. the first flag M=+1. From FIG. 8, a negative average neutral current, as indicated by the dashed horizontal line, is generated which acts to balance the capacitor voltages.

Figure 14A:
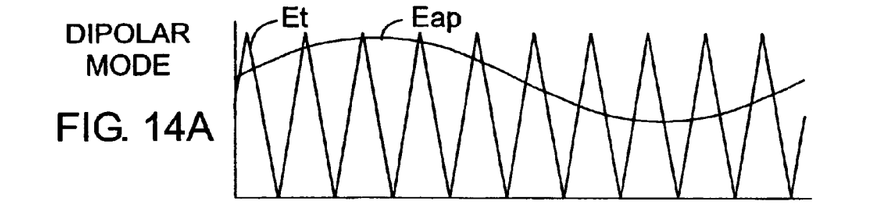
FIGS. 14A and 14B graphically illustrate the relationship of signals at inputs of a pair of comparators in the present power converter operating in the dipolar modulation mode.
Figure 14B:
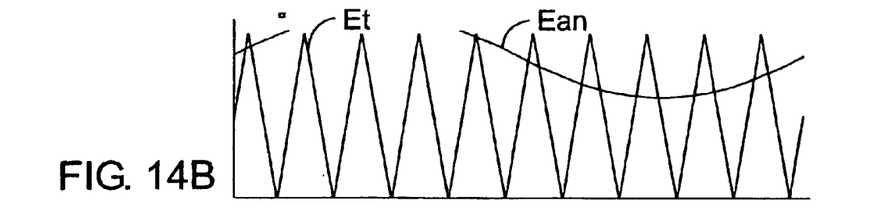
Figure 15A:
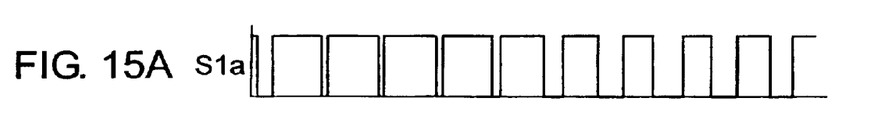
FIGS. 15A, 15B, 15C and 15D depict control signals for four semiconductor switches in one phase branch of the present inverter operating in the dipolar modulation mode.
Figure 15B:
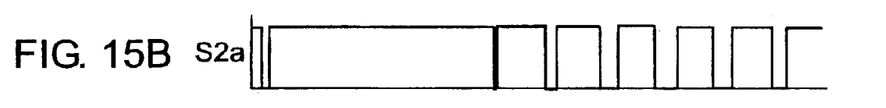
Figure 15C:
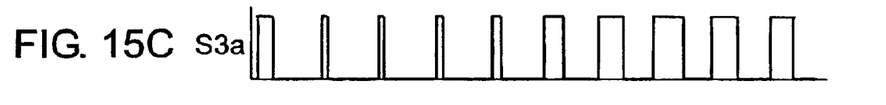
Figure 15D:
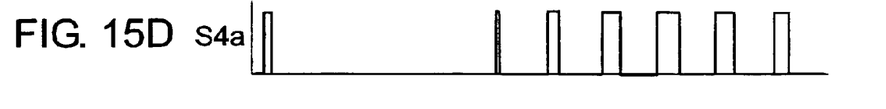

The capacitor voltage balancing operation of the inverter 14 in the dipolar modulation mode according to the present capacitor charge balancing technique is illustrated in FIG. 14 for a positive voltage error, i.e. first flag M=+1. Although an imbalance compensation coefficient F is added, the average value of the neutral current In is zero. Here, the absolute value of the imbalance compensation coefficient is saturated at the limit of 0.5(1−A). Hence, the bias value B is decremented, which shifts the operation of the inverter to the partial dipolar modulation mode as illustrated in FIG. 15. In that mode, a negative average neutral current is generated which acts to balance the capacitor voltages.

When the amplitude value A equals or exceeds '1', the maximum value of the imbalance compensation coefficient F is zero according to step 94 in FIG. 13. Hence, if the voltages across capacitors 20 and 21 are unbalanced for an operating condition with an amplitude value A greater than or equal to '1', then voltage balancing cannot be achieved. However, if the maximum value of the imbalance compensation coefficient F is set based on the maximum instantaneous value of the voltage references E*a, E*b, and E*c, then capacitor voltage balancing can be achieved even when the amplitude value A exceeds '1'. This alternative procedure 100 for determining the imbalance compensation coefficient F is depicted by the flowchart in FIG. 16 which is initially identical to the procedure in FIG. 13, except that steps 94 and 96 have been replaced by steps 102 and 104. Specifically at step 102, a determination is made whether the absolute value of imbalance compensation coefficient F is greater than the limit 0.5(1−max(E*a, E*b, E*c)). When that is true, the procedure branches to step 96 where the imbalance compensation coefficient F is set to the respective positive or negative limit at step 104, before advancing to step 98.

Figure 16:
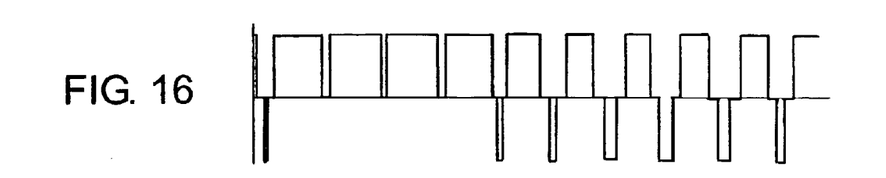
FIG. 16 is a graph of the resultant phase to neutral voltage produced by the control signals in FIGS. 15A–D.
Figure 17:
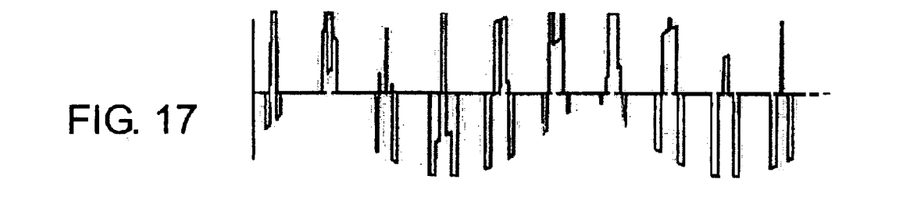
FIG. 17 is a graph of the neutral current and its average value in the dipolar modulation mode of the present power converter.
Figure 18A:
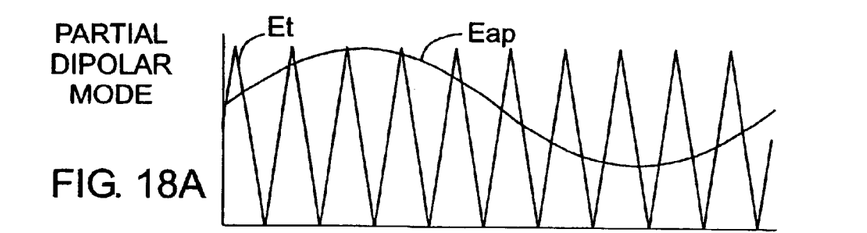
FIGS. 18A and 18B graphically illustrate the relationship of signals at inputs of a pair of comparators in the present power converter operating in the partial dipolar modulation mode.
Figure 18B:
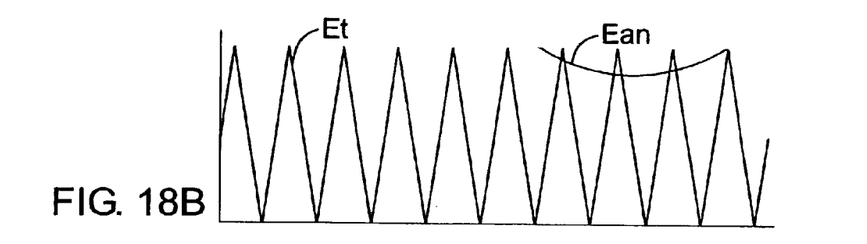
Figures 19A, 19B:
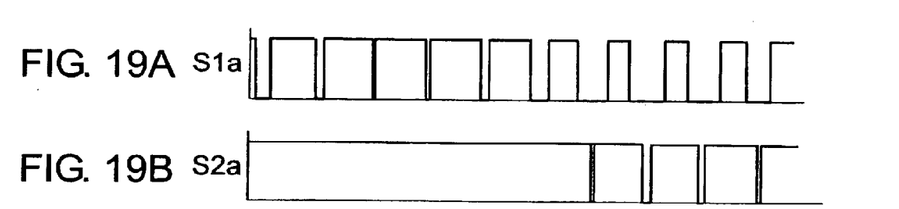
FIGS. 19A, 19B, 19C and 19D depict control signals for four semiconductor switches in one phase branch of the present inverter operating in the partial dipolar modulation mode.
Figure 19C:
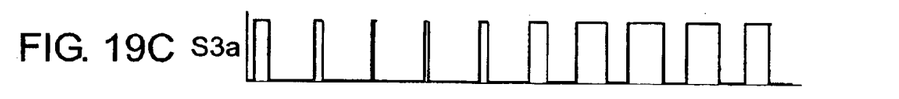
Figure 19D:
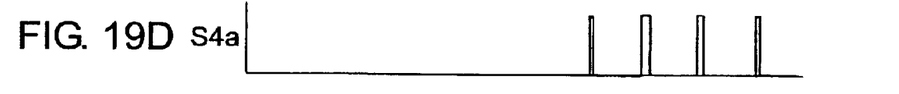
Figure 20:
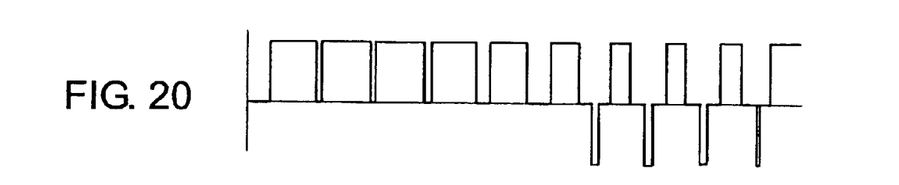
FIG. 20 is a graph of the resultant phase to neutral voltage produced by the control signals in FIGS. 19A–D.
Figure 21:
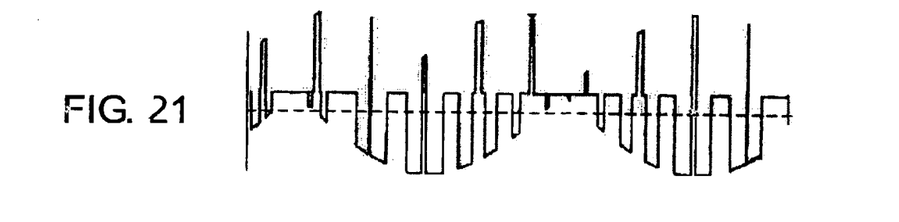
FIG. 21 is a graph of the neutral current and its average value in the partial dipolar modulation mode of the present power converter.
Figure 22:
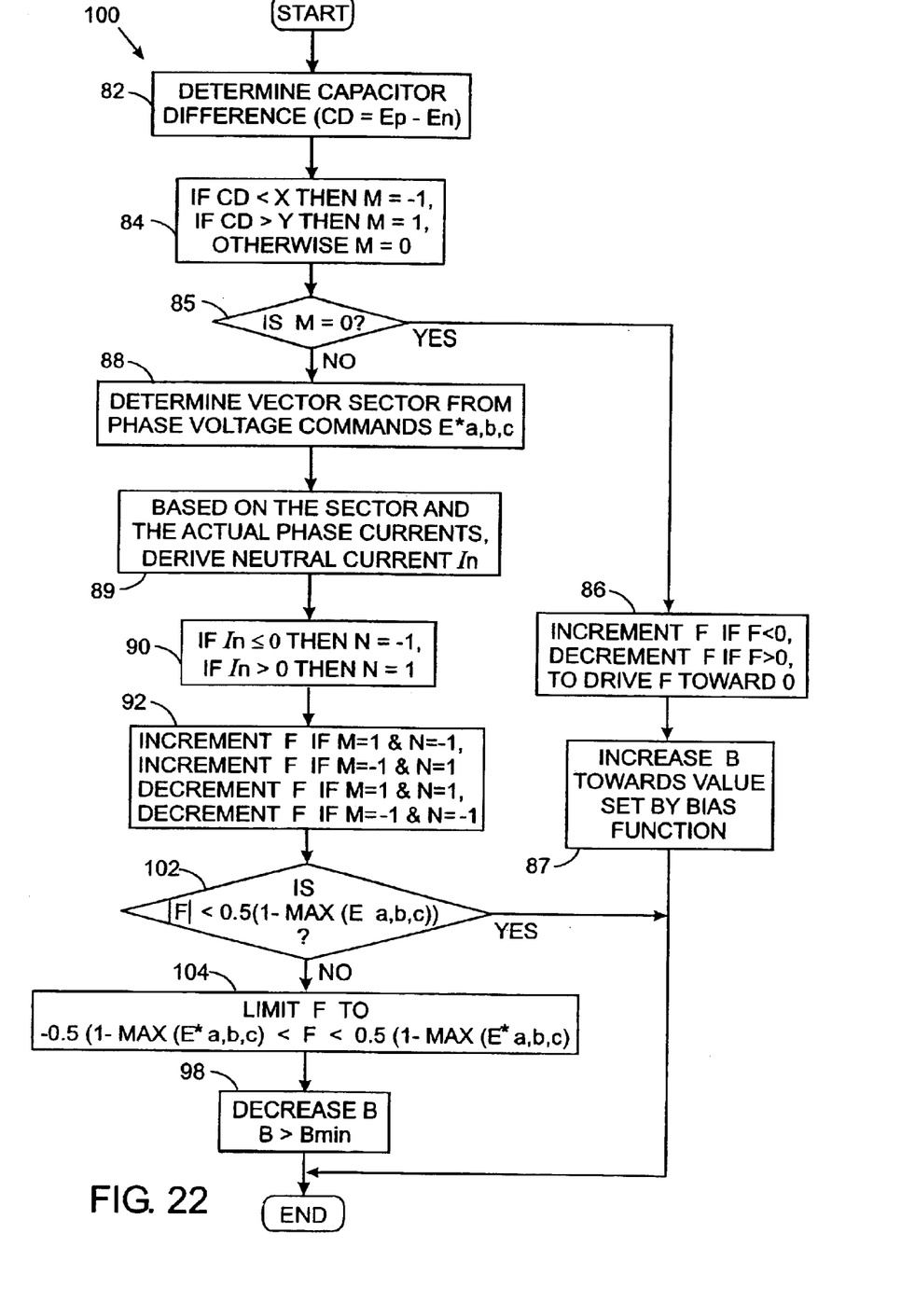
FIG. 22 is a flow chart of an second version of a procedure according to the present invention for determining the capacitor voltage imbalance compensation coefficient.
Figure 23A:
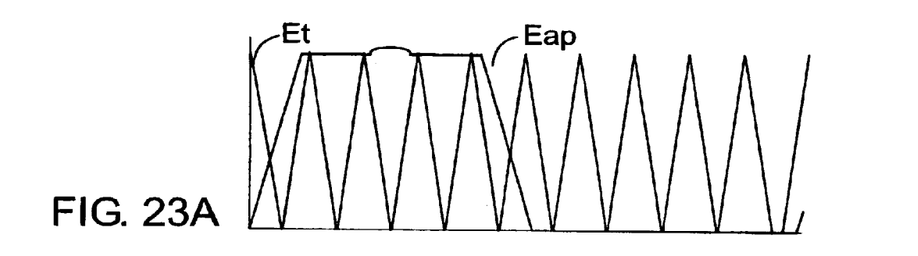
FIGS. 23A and 23B graphically illustrate the relationship of signals at inputs of two comparators in the present power converter which utilizes the imbalance compensation procedure of FIG. 22.
Figure 23B:
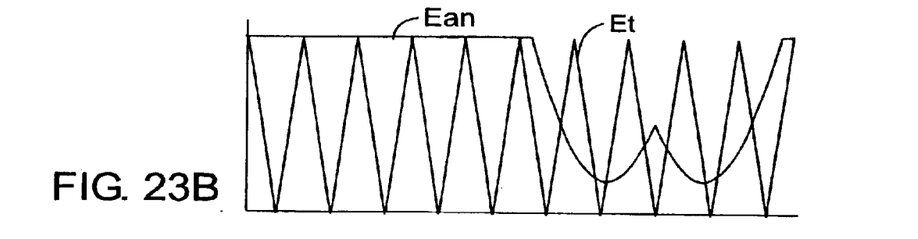
Figure 24A:
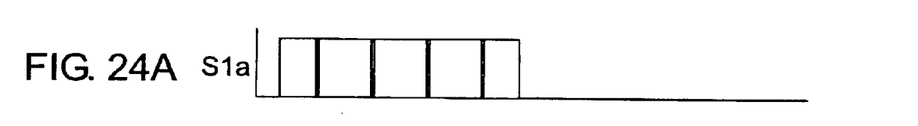
FIGS. 24A, 24B, 24C and 24D depict control signals for semiconductor switches in one inverter phase branch as a result of the imbalance compensation procedure of FIG. 22.
Figures 24B, 24C:
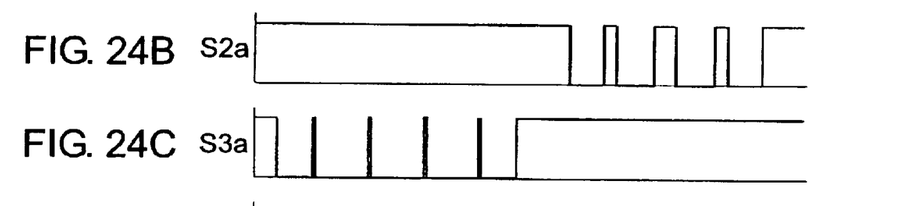
Figure 24D:
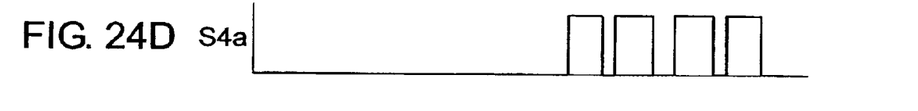
Figure 25:
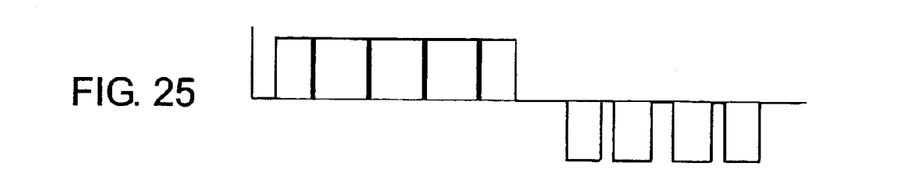
FIG. 25 is a graph of the resultant phase to neutral voltage produced by the control signals in FIGS. 24A–D.
Figure 26:
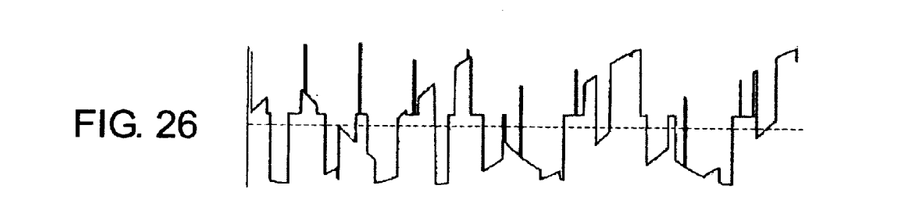
FIG. 26 is a graph of the neutral current and its average value which result from the control signals in FIGS. 24A–D.

The operation of the inverter 14 for amplitude value A equal to '1' with voltage balancing according to the modification of FIG. 16 is illustrated in FIGS. 23A–B, 24A–D, 25 and 26 for a positive voltage error, i.e. the first flag M=+1, where the neutral current In has a negative average value which acts to balance the capacitor voltages.

In the operation of the present inverter 14 according to the present modulation technique, the voltage produced between the phase terminal "a" and the neutral node 22 (phase to neutral voltage) always has three levels, a positive voltage, zero voltage and a negative voltage level, and there are no direct transitions between the positive voltage level and the negative voltage level. Hence, the common-mode voltage is low, and the magnitude of the step heights in the phase to neutral voltage are always equal to one-half of the DC input voltage, which results in lower peak voltages on the motor terminals. The present capacitor charge balancing technique provides a simple means to dynamically correct for the imbalance in the capacitor voltages even when the amplitude value exceeds '1'.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A power converter for producing an alternating voltage waveform for application to a load, said power converter comprising:

a first voltage supply bus and a second voltage supply bus with a DC voltage there between;

a plurality of capacitors connected in series between the first voltage supply bus and the second voltage supply bus and defining a neutral node;

a DC to AC inverter connected to the first voltage supply bus, the second voltage supply bus and the neutral node and having an output terminal; and a controller which operates the DC to AC inverter to produce alternating voltage waveform formed by a sequence of output pulses having positive, zero and negative voltage levels in which a plurality of output pulses occur during each half-cycle of a modulating waveform, wherein the controller adjusts a width of output pulses during consecutive half-cycles of the modulating waveform in response to a difference in voltages between the neutral node and each voltage supply bus so as to compensate for that difference.

2. The power converter as recited in claim 1 wherein the controller also adjusts the width of output pulses in response to a direction of current between the neutral node and the DC to AC inverter.

3. The power converter as recited in claim 2 wherein the controller determines the direction of current between the neutral node and the DC to AC inverter based on a voltage space vector and current flowing through the output terminal.

4. The power converter as recited in claim 3 wherein the controller determines the voltage space vector from a voltage command which designates a level of voltage that is desired to be applied to the load.

5. The power converter as recited in claim 1 wherein the DC to AC inverter comprises a three-phase inverter with three phase branches each having an output terminal and a plurality of switches which selectively couple the first voltage supply bus, the second voltage supply bus and the neutral node to the respective output terminal to produce the alternating voltage waveform that has positive, zero and negative voltage levels.

6. The power converter as recited in claim 5 wherein the controller also adjusts the width of output pulses in response to a direction of current between the neutral node and the inverter.

7. The power converter as recited in claim 1 wherein the controller comprises:

a generator of a carrier waveform;

a generator of a modulating waveform which oscillates; and an output circuit for producing a set of control signals in response to comparing the modulating waveform and the carrier waveform, wherein the control signals operate the DC to AC inverter.

8. The power converter as recited in claim 7 wherein the controller further comprises a mechanism which variably offsets the modulating waveform to adjust a width of the output pulses and thereby compensate for the difference in voltages.

9. A method for operating a power converter which includes an inverter that converts a DC voltage across first and second supply buses into an alternating voltage waveform at an output terminal to which a load can be connected, wherein the inverter is connected to a neutral node formed between first and second capacitors connected in series between the first and second supply buses, said method comprising:

operating the inverter to selectively couple the first supply bus, the second supply bus and the neutral node to the output terminal to produce the alternating voltage waveform formed by a sequence of output pulses having positive, zero and negative voltage levels;

deriving an imbalance compensation coefficient from a difference in voltages between the neutral node and each supply bus and from a direction of current between the neutral node and the inverter; and adjusting a width of the output pulses during consecutive half-cycles of a modulating waveform in response to the imbalance compensation coefficient.

10. The method as recited in claim 9 further comprising:

generating an oscillating carrier waveform;

generating a modulating waveform which oscillates; and comparing the modulating waveform and the oscillating carrier waveform to produce the control signals which are employed in operating the inverter.

11. The method as recited in claim 10 wherein adjusting a width of the output pulses comprises offsetting the modulating waveform.

12. The method as recited in claim 9 wherein deriving an imbalance compensation coefficient comprises:

detecting a difference in voltages across the first and second capacitors;

determining a direction of current between the neutral node and the inverter;

setting a value of the imbalance compensation coefficient in response to the difference in voltages and the direction of current.

13. The method as recited in claim 12 wherein determining a direction of current comprises:

ascertaining a space vector of voltage desired to be produced at the output terminal;

measuring output current flowing through the output terminal; and determining the direction of current in response to the space vector and the output current.

14. The method as recited in claim 13 wherein the space vector of voltage is ascertained in response to a voltage command which designates a level of voltage that is desired to be applied to the load.

15. A method for operating a power converter which includes an inverter that converts a DC voltage across first and second supply buses into an alternating voltage waveform at an output terminal for application to a load, wherein the inverter is connected to a neutral node formed between first and second capacitors connected in series between the first and second supply buses, said method comprising:

generating a carrier waveform;

generating a modulating waveform which oscillates;

deriving an imbalance compensation coefficient from a difference in voltages across the first and second capacitors and a direction of current between the neutral node and the inverter;

adjusting the modulating waveform in response to the imbalance compensation coefficient to form an adjusted waveform;

comparing the adjusted waveform to the carrier waveform and in response thereto producing a set of control signals; and operating the inverter, using the set of control signals, to selectively couple the first and second supply buses and the neutral node to the output terminal thereby producing the alternating voltage waveform which is formed by a sequence of output pulses having positive, zero and negative voltage levels.

16. The method as recited in claim 15 wherein generating a modulating waveform comprises generating a sinusoidal signal, producing an amplitude value, multiplying the sinusoidal signal by the amplitude value.

17. The method as recited in claim 16 further comprising producing a bias value, and adding the bias value to the result of multiplying the sinusoidal signal by the amplitude value, thereby forming a biased signal.

18. The method as recited in claim 17 wherein adjusting the sinusoidal waveform comprises adding the imbalance compensation coefficient to the biased signal, thereby forming the adjusted waveform.

19. The method as recited in claim 15 wherein deriving an imbalance compensation coefficient comprises:

detecting a difference in voltages across the first and second capacitors;

determining a direction of current between the neutral node and the inverter;

setting a value of the imbalance compensation coefficient in response to the difference in voltages and the direction of current.

20. The method as recited in claim 19 wherein determining a direction of current comprises:

ascertaining a space vector of voltage desired to be produced at the output terminal;

measuring output current flowing through the output terminal; and determining the direction of current in response to the space vector and the output current.

21. The method as recited in claim 20 wherein the space vector is ascertained in response to voltage command which designates a level of voltage that is desired to be applied to the load.

22. The method as recited in claim 15 wherein generating a carrier waveform produces an oscillating waveform.

23. The method as recited in claim 15 wherein generating a carrier waveform produces a triangular waveform.

* * * * *